United States Patent
Vivanco et al.

(10) Patent No.: US 11,889,404 B2
(45) Date of Patent: *Jan. 30, 2024

(54) HANDOVER FOR AERIAL USER EQUIPMENT SERVED BY TERRESTRIAL NETWORKS

(71) Applicants: AT&T Intellectual Property I, L.P., Atlanta, GA (US); AT&T Technical Services Company, Inc., Vienna, VA (US)

(72) Inventors: Daniel Vivanco, Ashburn, VA (US); David Beppler, Duluth, GA (US); Slawomir Stawiarski, Carpentersville, IL (US)

(73) Assignees: AAT&T Intellectual Property I, L.P., Atlanta, GA (US); AT&T Technical Services Company, Inc., Vienna, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/069,101

(22) Filed: Dec. 20, 2022

(65) Prior Publication Data

US 2023/0119419 A1    Apr. 20, 2023

Related U.S. Application Data

(63) Continuation of application No. 17/099,997, filed on Nov. 17, 2020, now Pat. No. 11,564,149.

(51) Int. Cl.
*H04W 48/04* (2009.01)
*H04W 4/021* (2018.01)
(Continued)

(52) U.S. Cl.
CPC ........... *H04W 48/04* (2013.01); *B64C 39/024* (2013.01); *H04W 4/021* (2013.01); *H04W 8/20* (2013.01); *H04W 36/32* (2013.01)

(58) Field of Classification Search
None
See application file for complete search history.

(56) References Cited

U.S. PATENT DOCUMENTS

| | | | |
|---|---|---|---|
| 6,108,538 | A | 8/2000 | Blasiak et al. |
| 7,363,038 | B2 | 4/2008 | Kim et al. |

(Continued)

FOREIGN PATENT DOCUMENTS

| | | |
|---|---|---|
| CN | 106338492 A | 1/2017 |
| CN | 109827574 A | 5/2019 |

(Continued)

OTHER PUBLICATIONS

Bazan et al., "Artificial intelligence techniques in handover decision: a brief review," Revista Ingeniantes, vol. 6, No. 1, p. 1, 2019; 6 pages.

(Continued)

*Primary Examiner* — Charles N Appiah
*Assistant Examiner* — Frank E Donado
(74) *Attorney, Agent, or Firm* — Guntin & Gust, PLC; Kenneth S. Kwan

(57) ABSTRACT

An architecture to avoid handover ping-pong for aerial user equipment (UE) operational in terrestrial fourth generation (4G) and/or fifth generation (5G) long term evolution (LTE) networks. A method can comprise receiving a request to connect to the network equipment from aerial user equipment; based on the request to connect, retrieving subscription data; based on the subscription data, determining that the aerial user equipment is aerial equipment; determining that the aerial user equipment is engaged in a ping-pong handover event with terrestrial based network equipment situated within a defined geographic area; and transmitting instructions to the aerial user equipment to confirm the ping-pong handover event, wherein the instruction com- (Continued)

prises a delay value representing a back off time value for the aerial user equipment to refrain from gathering measurement data within the defined geographic area.

20 Claims, 11 Drawing Sheets

(51) Int. Cl.
*B64C 39/02* (2023.01)
*H04W 36/32* (2009.01)
*H04W 8/20* (2009.01)

(56) References Cited

U.S. PATENT DOCUMENTS

| | | |
|---|---|---|
| 9,622,133 B1 | 4/2017 | Guvenc |
| 9,866,313 B1 | 1/2018 | Murphy |
| 9,986,440 B2 | 5/2018 | Guvenc |
| 10,020,872 B2 | 7/2018 | Murphy |
| 10,663,597 B1 | 5/2020 | Dormiani |
| 2018/0324580 A1 | 11/2018 | Phuyal et al. |
| 2019/0045406 A1 | 2/2019 | Kalathil et al. |
| 2019/0182730 A1 | 6/2019 | Yeh et al. |
| 2019/0306675 A1* | 10/2019 | Xue ............... H04B 17/345 |
| 2019/0313317 A1 | 10/2019 | Murphy |
| 2019/0364472 A1* | 11/2019 | Yeh ............... H04L 43/16 |
| 2020/0022039 A1 | 1/2020 | Kadiri et al. |
| 2020/0162977 A1* | 5/2020 | Lee ............... H04W 36/0088 |
| 2020/0187072 A1 | 6/2020 | Hong |
| 2020/0236573 A1 | 7/2020 | Zhang et al. |
| 2020/0252838 A1 | 8/2020 | Akdeniz et al. |
| 2021/0297921 A1 | 9/2021 | Pragada et al. |
| 2021/0321311 A1* | 10/2021 | Lu ............... H04W 36/0061 |

FOREIGN PATENT DOCUMENTS

| | | | |
|---|---|---|---|
| EP | 3 675 554 A1 | 7/2020 | |
| EP | 3635996 B1 * | 12/2022 | ........ H04W 36/0088 |
| GB | 2 576 203 A | 2/2020 | |
| WO | 2013/010370 A1 | 1/2013 | |
| WO | 2015/113253 A1 | 8/2015 | |
| WO | 2019/056982 A1 | 3/2019 | |
| WO | 2019/151917 A1 | 8/2019 | |
| WO | 2019/201440 A1 | 10/2019 | |
| WO | 2020/032591 A1 | 2/2020 | |
| WO | 2020/107414 A1 | 6/2020 | |

OTHER PUBLICATIONS

Mubarak et al., Fuzzy Logic Based Self-Adaptive Handover Algorithm for MobileWiMAX, Wireless Pers Commun (2013) 71:1421-1442.

Chen et al., "A Deep Reinforcement Learning Approach to Efficient Drone Mobility Support," arXiv:2005.05229v1 [cs.IT] May 11, 2020; 9 pages.

Goudarzi et al., "Employing Unmanned Aerial Vehicles for Improving Handoff using Cooperative Game Theory," IEEE Transactions on Aerospace and Electronic Systems PP(99); Sep. 2020; 17 pages.

Li et al., "A Reinforcement Learning Based User Association Algorithm for UAV Networks," 2018 28th International Telecommunication Networks and Applications Conference (ITNAC); 6 pages.

Onel et al., "A multicriteria handoff decision scheme for the next generation tactical communications systems," Computer Networks 46 (2004) 695-708.

Motivation for Study on Enhanced LTE Support for Aerial Vehicles, NTT Docomo Inc, Ericsson, 3GPP TSG RAN ft75, Dubrovnik, Croatia, Mar. 6-9, 2017, AI 10.1.2, RP-170157, 8 pages.

New SID on Enhanced Support for Aerial Vehicles, NTT Docomo Inc, Ericsson, 3GPP TSG RAN Meeting #75, Dubrovnik, Croatia, Mar. 6-9, RP-170742, 5 pages.

New SID on Enhanced Support for Aerial Vehicles, NTT Docomo Inc, Ericsson, 3GPP TSG RAN Meeting #75, Dubrovnik, Croatia, Mar. 6-9, RP-170779, 4 pages.

Non-Final Office Action received for U.S. Appl. No. 17/099,997 dated Mar. 24, 2022, 78 pages.

* cited by examiner

| EVENT | TRIGGER CONDITION |
|---|---|
| A1 | SERVING EQUIPMENT BECOMES BETTER THAN THRESHOLD VALUE |
| A2 | SERVING EQUIPMENT BECOMES WORSE THAN THRESHOLD VALUE |
| A3 | NEIGHBOR EQUIPMENT BECOMES BETTER THAN THRESHOLD VALUE |
| A4 | NEIGHBOR EQUIPMENT BECOMES WORSE THAT THRESHOLD VALUE |
| A5 | SERVING EQUIPMENT BECOMES WORSE THAN A FIRST THRESHOLD VALUE AND NEIGHBOR BECOMES BETTER THAN A SECOND THRESHOLD VALUE |
| B1 | INTER RAT NEIGHBOR BECOMES BETTER THAN THRESHOLD VALUE |
| B2 | SERVING EQUIPMENT BECOMES WORSE THAN A FIRST THRESHOLD VALUE AND INTER RAT NEIGHBOR BECOMES BETTER THAN A SECOND THRESHOLD VALUE |

FIG. 6

HANDOVER FOR AERIAL USER EQUIPMENT SERVED BY TERRESTRIAL NETWORKS

RELATED APPLICATION

The subject patent application is a continuation of, and claims priority to, U.S. patent application Ser. No. 17/099,997, filed Nov. 17, 2020, and entitled "HANDOVER FOR AERIAL USER EQUIPMENT SERVED BY TERRESTRIAL NETWORKS," the entirety of which priority application is hereby incorporated by reference herein.

TECHNICAL FIELD

The disclosed subject matter provides systems and methods to avoid handover ping-pong for aerial user equipment (UE) operational on terrestrial fourth generation (4G), fifth generation (5G) long term evolution (LTE) networks and/or other next generation networks.

BACKGROUND

The ping-pong handover issue for aerial user equipment (UE) can be caused by the sending and receiving of frequent measurement reports, which typically are not required at cell edge regions of wired and/or wireless communication networks. In instances where aerial user equipment is flying at high altitude and is in an edge section between serving cell equipment and strong neighbor cell network equipment, ping-pong handover can occur as a consequence of the unnecessary sending and/or receiving of measurement reports. In the context of ping-pong handover, ping-pong handover events are more likely to occur with respect to aerial user equipment rather than in regard to terrestrial based user equipment, because aerial user equipment, at altitude, generally has better line of sight (LOS) to ground based networking equipment, such as serving cell equipment and/or neighbor cell network equipment; altitude effectively magnifies the cell edge coverage area of neighbor cell network equipment.

BRIEF DESCRIPTION OF DRAWINGS

FIG. 6 provides depiction of a table that can be used in conjunction with the flow chart or method outlined in FIG. 5 for LTE coverage handover, in accordance with aspects of the subject disclosure.

DETAILED DESCRIPTION

Figure 1:
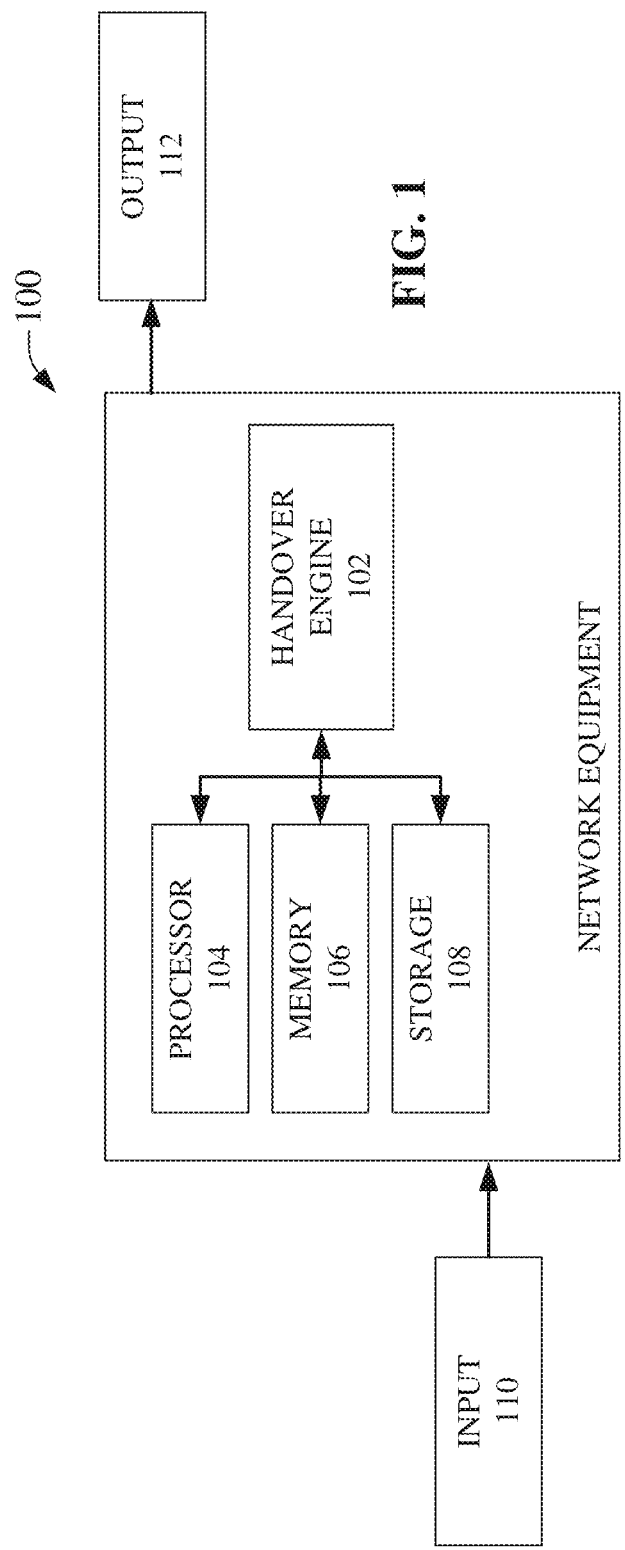
FIG. 1 is an illustration of a system that prevents handover ping-pong for aerial user equipment (UE) operational on terrestrial fourth generation (4G) and/or fifth generation (5G) long term evolution (LTE) networks, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

The disclosed systems and methods, in accordance with various embodiments, provide a system, apparatus, equipment, or device comprising: a processor, and a memory that stores executable instructions that, when executed by the processor, facilitate performance of operations. The operations can comprise receiving, from an aerial user equipment, a request to connect to the network equipment; based on the request to connect, obtaining subscription data; determining, based on the subscription data, that the aerial user equipment is aerial equipment; determining that the aerial user equipment is engaged in a ping-pong handover event with terrestrial based network equipment situated within a defined geographic area; and sending instructions to the aerial user equipment to confirm the ping-pong handover event, wherein the instruction comprises a delay value representing a back off time value for the aerial user equipment to refrain from gathering measurement data within the defined geographic area.

In the above context the aerial user equipment is traveling through the defined geographic area controlled by the network equipment; and the subscription data comprises an indicator representing that the aerial user equipment is currently airborne within the defined geographic area controlled by the terrestrial based network equipment.

Additional operations can comprise facilitating the aerial user equipment to adjust an altitude value over which the aerial user equipment is hovering; facilitating the aerial equipment to adjust a global positioning satellite coordinate value to move the aerial user equipment from a first location within the defined geographic area to a second location within the defined geographic area; and monitoring additional ping-pong handover events between the aerial user equipment and the terrestrial based network equipment situated within a defined geographic area.

In the foregoing regard, when the instruction is a first instruction, the delay value is a first delay value, and the back off time value is a first back off time value, and wherein the operations further comprise sending to the aerial user equipment a second instruction comprising a second delay value representing a second back off time value, wherein in some instances the second back of time value is greater than the first back off time value, or in alternative instances the first back off time value is greater than the second back off time value.

In accordance with further embodiments, the subject disclosure describes a method and/or process, comprising a series of acts that, for example, can include: receiving, by a system, device, equipment, and/or apparatus comprising a processor, a request to connect to the network equipment from aerial user equipment; based on the request to connect, obtaining subscription data; based on the subscription data, determining that the aerial user equipment is aerial equipment; determining that the aerial user equipment is engaged in a ping-pong handover event with terrestrial based network equipment situated within a defined geographic area; and transmitting instructions to the aerial user equipment to confirm the ping-pong handover event, wherein the instruction comprises a delay value representing a back off time value for the aerial user equipment to refrain from gathering measurement data within the defined geographic area.

In regard the foregoing, the aerial user equipment can be traveling through the defined geographic area controlled by the network equipment; and the subscription data can comprise an indicator representing that the aerial user equipment is currently airborne within the defined geographic area controlled by the terrestrial based network equipment.

Additional acts can include: facilitating the aerial user equipment to adjust an altitude value over which the aerial user equipment is hovering; facilitating the aerial equipment to adjust a global positioning satellite coordinate value to move the aerial user equipment from a first location within the defined geographic area to a second location within the defined geographic area; and monitoring, by the network equipment, additional ping-pong handover events between the aerial user equipment and the terrestrial based network equipment situated within a defined geographic area.

In accordance with still further embodiments, the subject disclosure describes a machine readable medium, a computer readable storage device, or non-transitory machine readable media comprising instructions that, in response to execution, cause a computing system (e.g., equipment, devices, groupings of devices, etc.) comprising at least one processor to perform operations. The operations can include: receiving a request to connect to the network equipment from aerial user equipment; based on the request to connect, retrieving subscription data; based on the subscription data, determining that the aerial user equipment is aerial equipment; determining that the aerial user equipment is engaged in a ping-pong handover event with terrestrial based network equipment situated within a defined geographic area; and transmitting instructions to the aerial user equipment to confirm the ping-pong handover event, wherein the instruction comprises a delay value representing a back off time value for the aerial user equipment to refrain from gathering measurement data within the defined geographic area.

Additional operations can include monitoring additional ping-pong handover events between the aerial user equipment and the terrestrial based network equipment situated within a defined geographic area.

Many use cases of unmanned aerial vehicles (UAVs) require beyond visual line-of-site (LOS) communications. Mobile networks offer wide area, high speed, and secure wireless connectivity, which can enhance control and safety of UAV operations and enable beyond visual LOS use cases. Existing long term evolution (LTE) networks can support initial drone deployments. LTE evolution and 5G can provide more efficient connectivity for wide-scale drone deployments. New and exciting applications for drones are emerging. A potential business area for mobile network operators. Use cases of commercial UAVs are growing rapidly, including delivery, communications and media, inspection of critical infrastructure, surveillance, search-and-rescue operations, agriculture, etc.

Research and development of current mobile broadband communication (e.g., LTE) has been primarily devoted to terrestrial communication. Providing tether-less broadband connectivity for unmanned aerial vehicles is an emerging field.

Figure 7:
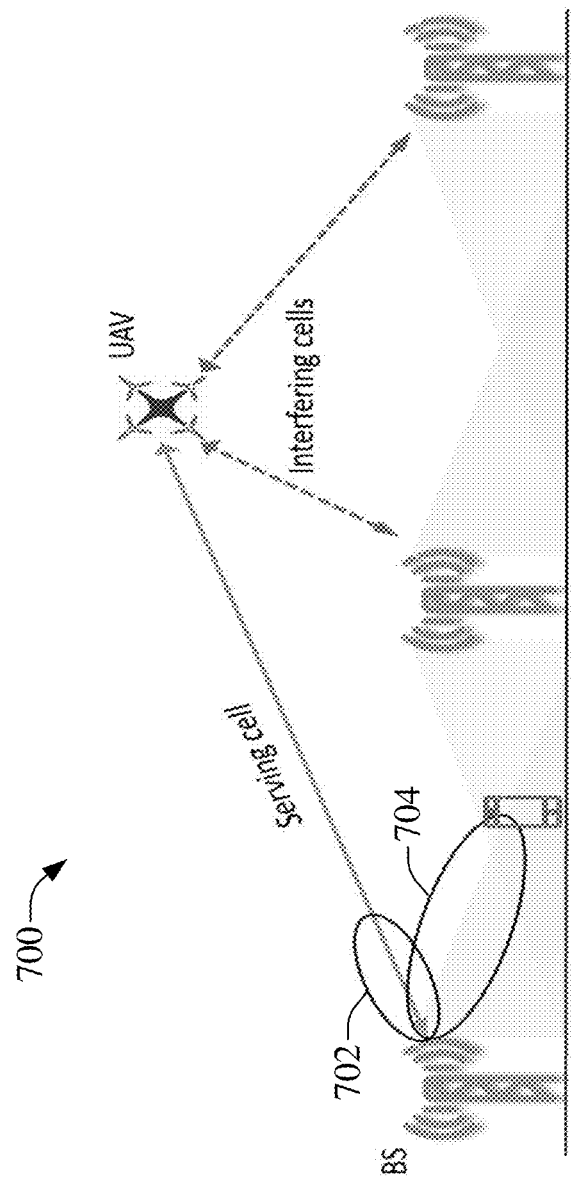
FIG. 7 provides illustration of how network equipment antenna direction affects aerial user equipment, in accordance with aspects of the subject disclosure.

One main aspect that makes using LTE to serve UAVs challenging is the fact that mobile LTE networks are generally optimized for terrestrial broadband communication. Thus, the antennas associated with terrestrial based network equipment (such as base station equipment, eNodeB equipment, eNB equipment, gNodeB equipment, picocell equipment, macrocell equipment, microcell equipment, femtocell equipment, IoT equipment operating as mobile network operation (MNO) network equipment, access point equipment, and the like) are typically down-tilted to reduce the interference power levels to other networking equipment. With down tilted antennas, small UAVs may thus only be served by transmission or broadcast side lobes of the antennas associated with terrestrial based network equipment. FIG. 7 illustrates the broadcast disparity between the down-tilted antennas 702 and side lobes 704.

Due to the presence of possible voids or nulls in the transmission side lobes 704, and due to close-to-free-space propagation in the sky, aerial UAVs or aerial UEs can detect several ground-based network equipment within a defined geographical area. In addition, aerial UEs, since they typically are positioned above terrestrial based radio equipment and above radio signal echo (e.g., radio clutter) emanating from network equipment, can detect stronger signals from distant network equipment (e.g., interfering cells) than terrestrial based UEs that are more geographically proximate. Thus, an aerial UE can be served by much more distant network equipment (e.g., interfering cells) instead of the most proximate network equipment.

With regard to radio signal echo or radio clutter, this can be the result of broadcast radio signals being returned from, or reflected off, the ground (e.g., terrestrial features such as hills, valleys, rocky outcrops, manmade structures, and/or other similar topographical features), from the sea or bodies of water, rain, clusters of insects and/or birds, groupings of animals, as well as localized atmospheric turbulences. Radio signal echoes or radio clutter can have a deleterious impact on ground based radio signal propagation and/or reception. At height, aerial UEs typically are not subject to the same deleterious impacts of radio signal echo or radio clutter, and as such, aerial UEs, while airborne, are not shielded to the same effect as land-based UEs, in the context of transmissions from distant network equipment.

The ping-pong handover issue for aerial UEs can be caused by a surfeit of measurement reporting between various network equipment and/or UE (terrestrial and/or aerial) which generally is unnecessary in cell edge regions of a wired and/or wireless network architecture. If aerial UE are at high altitude above terrain but the aerial UE is actually hovering in some region at an edge section of a mobile network operator (MNO) entity's wired and/or wireless network architecture, between serving cell equipment and/or neighbor cell equipment, ping-pong handover events can occur because of the unnecessary measurement reporting between the various equipment (e.g., serving cell equipment, aerial UE, and/or neighbor cell equipment). This situation is typically more likely to occur in the context of aerial UE and terrestrial based network equipment (e.g., serving cell equipment and/or neighbor cell equipment) than with regard to terrestrial based UE and terrestrial based network equipment, because at altitude the LOS between the aerial UE and terrestrial based network equipment is manifestly greater, which can make edge section coverage of neighbor cell equipment from the perspective of aerial UE markedly larger in comparison to interactions between ground based UE and ground based network equipment. The relative disparities in coverage areas between terrestrial coverage areas and aerial coverage areas, as illustrated in FIG. 8, can be at the heart of the handover ping-pong problem as depicted in FIG. 9.

Figure 8:
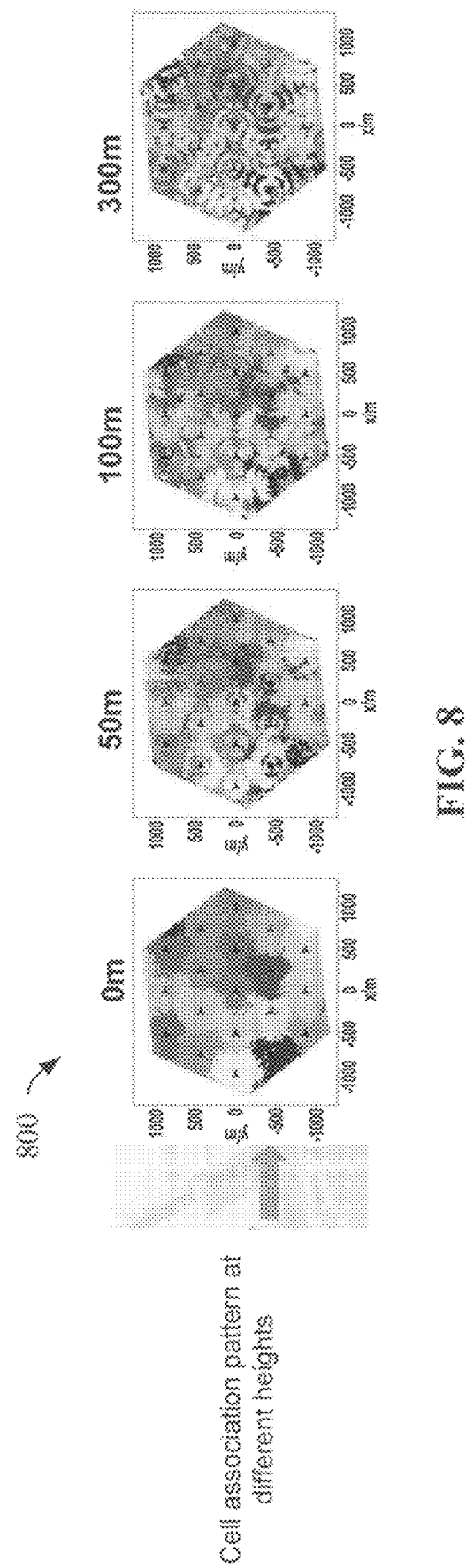
FIG. 8 provides depiction of network equipment association patterns at different altitudes, in accordance with aspects of the subject disclosure.

In FIG. 8 it will be observed, that at lesser heights, for example, at 0 meters (m) the broadcast coverage area pattern of network cell equipment is generally distinct and clear; the coverage areas being defined clusters around one or more central point associated with respective network cell equipment. However, at greater heights (e.g., 50m, 100m, 300m) the coverage areas associated with respective network equipment become less and less well defined and more and more amorphous.

Figure 9:
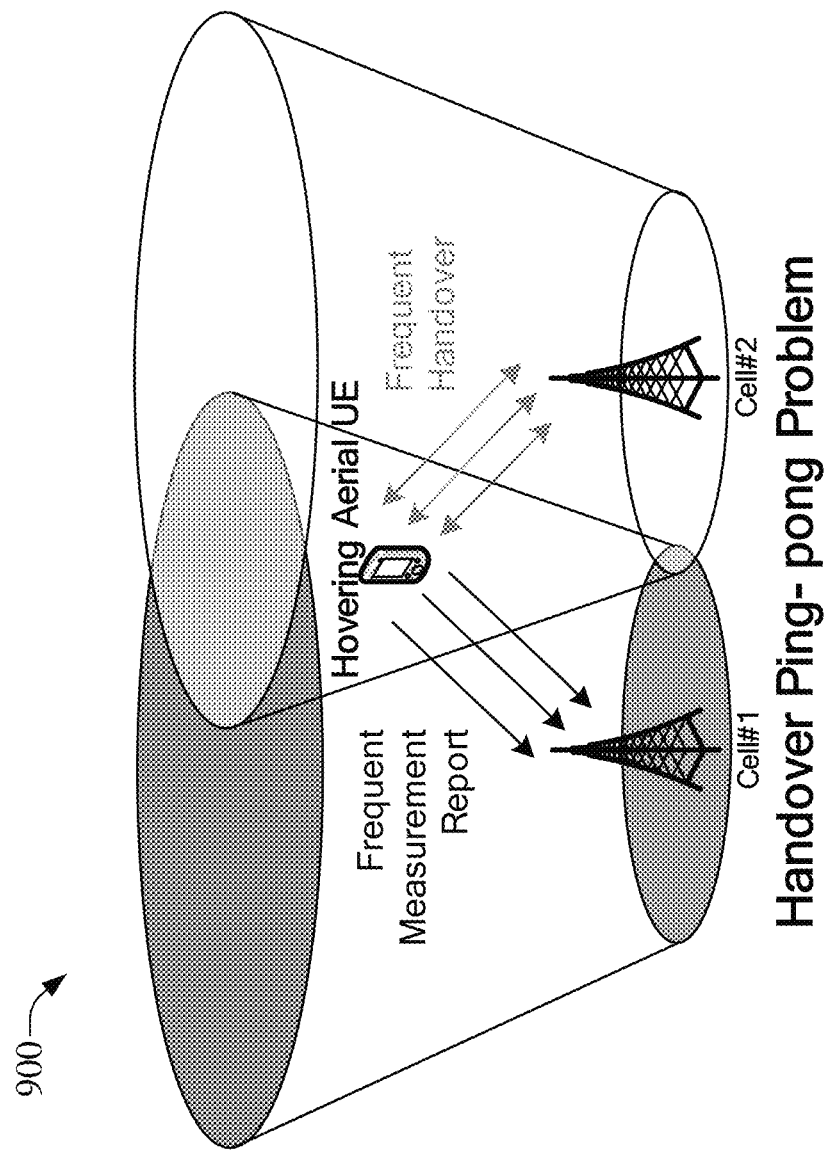
FIG. 9 provides illustration of the handover ping-pong problem, in accordance with aspects of the subject disclosure.

In FIG. 9, cell #1 represents the serving cell equipment to which the hovering aerial UE is associated with, while cell #2 is the strong neighbor cell equipment to which the hovering aerial UE is frequently handed over to. As will also be noted, the hovering aerial UE is sending a multiplicity of frequency measurement reports to its serving cell equipment (e.g., cell #1).

Frequent handover can yield large signaling overhead, increased battery drainage due to increased signaling, and an increase in radio link failure (e.g., handover failure). Handover failures when they occur can necessitate unneeded retransmissions, reconnections, and the like, which in turn can result in undesirable latency issues.

As will be noted, current LTE handover mechanisms are generally tailored to terrestrial based network equipment and terrestrial based UEs. Ground based UEs generally do not change altitude while moving through the wireless and/or wireless network architecture. Moreover, network equipment (e.g., base station (BS) equipment, serving cell equipment, neighbor network equipment, and other similarly appropriate equipment) associations with ground based UEs is much smaller than network equipment association with aerial UEs.

In instances where an aerial UE is EN-DC (evolved UMTS terrestrial radio access (E-UTRA)-new radio-dual connectivity) capable (e.g., the aerial UE supports dual connectivity between LTE and 5G radio access technologies (RATs), the foregoing problems can also propagate to 5G RATs and can compound the issue.

In regard to new radio (NR) cell equipment activation and/or deactivation: aerial UEs that are connected to LTE serving cell equipment, the LTE serving cell equipment (e.g., MeNB) can configure the aerial UE with B1 measurement data (e.g., LTE and/or inter-RAT measurements, wherein B1 measurement data typically relates to instances where inter-RAT neighbor cell equipment signal values become greater than a defined threshold value). When an aerial UE finds NR cell equipment with sufficient signal level, the aerial UE sends a B1 measurement report to the LTE serving cell equipment. The LTE serving cell equipment then attempts to establish EN-DC with the strongest NR cell equipment. If successful the NR cell equipment is added. The aerial UE can then transmit and received data via using both LTE and 5G radio technologies simultaneously. Conversely, where the LTE serving cell equipment is unable to establish EN-DC with NR cell equipment, the LTE serving cell equipment can deactivate the NR cell equipment, in response to the aerial UE moving out of the coverage area controlled by the LTE serving cell equipment and/or based on a poor NR signal report.

In instances where aerial UE is EN-DC capable, aerial ping-pong can affect both LTE and 5G; frequent LTE to LTE handover and frequent NR activation and/or NR deactivation.

In order to overcome the foregoing limitations, third generation partnership project (3GPP) standards mandate that handover has to be managed by network equipment (e.g., eNB equipment and/or gNB equipment), wherein network equipment sends UEs (e.g., terrestrial based and/or aerial based) measurement configuration data during radio resource control (RRC) connection (RRC_CONNECTION). The RRC-CONNECTION data can typically be transmitted as RRCConnectionReconfiguration messages comprising measurement configuration (measConfig) fields, one of which can include a s-Measure value.

The s-Measure value is typically standard and usually the same for all UEs that connect to eNB equipment. However, eNB equipment can change or modify the s-Measure value for specific UE. The eNB equipment can facilitate this change to the s-Measure value by sending a modified and/or specifically unique RRCConnectionReconfiguration message directed to the specific UE. In this context, different values can be assigned to s-Measure to initiate intra/inter-frequency measurements. Further, in the context of s-Measure values, these are threshold values that can be used in relation to received signal received power (RSRP) values, wherein when a UE is in active mode, intra frequency measurements are activated when RSRP values fall below the s-Measure values (e.g., RSRP<s-Measure).

The 3GPP also requires that if signal strength values associated with serving cell equipment falls below a s-Measure value, UE need to search for neighboring cell equipment and report the neighboring cell equipment to the serving cell equipment if the signal strength associated with neighboring cell equipment is at least equal to, or exceeds, a defined or determinable threshold value. Generally, UEs report the fact that the signal strength associated with neighboring cell equipment is at least equal to, or exceeds, a defined or determinable threshold value as A3-Event report data (e.g., that the signal strength associated with neighbor cell equipment is better than the signal strength associated with the serving cell equipment). Serving cell equipment receives the A3-Event report data and based on, or in response to receiving the A3-Event report data, the serving cell equipment selects target cell equipment and commences a handover process to neighbor cell equipment associated with better signal strength.

The handover process can commence when UE determines that signal strength of serving cell equipment falls below the s-Measure threshold value. Ping-pong handover avoidance or ping-pong minimization should start at this stage in order to reduce signal overhead and UE battery drainage.

Existing LTE handover optimization processes (e.g., mobility robustness optimization (MRO)) can fine tune handover parameters that can affect all UEs served by eNB equipment and/or gNB equipment. MRO can be implemented with the aim of minimizing handover failure and reducing ping-pong handover events by adjusting handover parameters. Handover failure events can occur where a handover is mistimed and is too late, wherein a radio link failure (RLF) occurs in serving cell equipment prior to handover or during the handover process, this can necessitate the UE to reconnect to target cell equipment that is different from the serving cell equipment. Handover failures can further occur when the handover is mistimed and is too early, wherein a RLF occurs shortly after a successful handover to target cell equipment, which can necessitate the UE to reconnect to serving cell equipment. Handover failures can also occur where there is a wrong handover, wherein a RLF occurs shortly after a successful handover to target cell equipment, which can necessitate the UE to reconnect to disparate cell equipment that is neither serving cell equipment nor target cell equipment.

Additionally, MRO can also be implemented in instances of unnecessary handovers. Unnecessary handovers can include ping-pong handovers, wherein there is a handover to serving cell equipment from target cell equipment shortly after there has been a successful handover to target cell equipment. Additional unnecessary handover instances can occur when there are continuous handovers, wherein there are handovers to cell equipment that is neither serving cell equipment nor target cell equipment shortly after a successful handover to target cell equipment.

Therefore, when MRO processes are used to prevent handover ping-pong for aerial UEs served by terrestrial based 4G and/or 5G network equipment, such implementation can affect terrestrial UEs as well as aerial UEs served by terrestrial based network equipment. While the implementation of MRO processes can improve handover from aerial UEs, such an implementation can worsen handover for ground based UEs.

In order to overcome the foregoing issues, the subject disclosure adds events and/or conditions into the handover process. These additional events and/or conditions are intended to impact aerial UEs without impacting terrestrial based UEs.

With reference to the Figures, FIG. 1 illustrates a system 100 that mitigates or avoids handover ping-pong for aerial UEs which are served by terrestrial 4G and 5G network equipment. System 100 can be central node global control equipment located on the core network. Examples of central node global control equipment can be mobile edge compute (MEC) equipment, self organized network (SON) equipment, and/or radio access network intelligent controller (RIC) equipment.

As illustrated system 100 can comprise handover engine 102 that can be communicatively coupled to processor 104, memory 106, and storage 108. Handover engine 102 can be in communication with processor 104 for facilitating operation of computer and/or machine executable instructions and/or components by handover engine 102, memory 106 for storing data and/or the computer or machine executable instructions and/or components, and storage 108 for providing longer term storage for data and/or machine and/or computer machining instructions. Additionally, system 100 can receive input 110 for use, manipulation, and/or transformation by handover engine 102 to produce one or more useful, concrete, and tangible result, and/or transform one or more articles to different states or things. Further, system 100 can also generate and output the useful, concrete, and tangible results, and/or the transformed one or more articles produced by handover engine 102, as output 112.

In some embodiments, system 100 can be an Internet of Things (IoT) small form factor equipment capable of effective and/or operative communication with a network topology. Additionally in alternative embodiments, system 100 can be any type of mechanism, machine, device, apparatus, equipment, and/or instrument that can be utilized to avoid or mitigate handover ping-pong events in the context of aerial UEs being served by terrestrial based 4G and/or 5G network equipment. Examples of types of mechanisms, equipment, machines, devices, apparatuses, and/instruments can include virtual reality (VR) devices, wearable devices, heads up display (HUD) devices, machine type communication devices, and/or wireless devices that communicate with radio network nodes in a cellular or mobile communication system. In various other embodiments, system 100 can comprise tablet computing devices, handheld devices, server class computing machines and/or databases, laptop computers, notebook computers, desktop computers, cell phones, smart phones, commercial and/or consumer appliances and/or instrumentation, industrial devices and/or components, personal digital assistants, multimedia Internet enabled phones, Internet enabled devices, multimedia players, aeronautical/avionic devices associated with, for example, orbiting satellites and/or associated aeronautical vehicles, and the like.

Handover engine 102 can user UE subscription data and/or subscriber priority (SPID) data to identity what type of UE is traveling through the network. Where handover engine 102 detects that the UE is performing ping-pong handover, and a UE type field included in the UE subscription data and/or SPID data indicates that the UE is an aerial type UE, handover engine 102 can send a message to the UE (now aerial UE) requesting the aerial UE to confirm that it is experiencing ping-pong handover events and the aerial UE should react in accordance with an established ping-pong handover process. Handover engine 102 can also add in the message sent to the aerial UE an A2_event delay value (T1), which can be a determined or determinable time value. The time value sent as the A2_event delay value can be ascertained based at least in part of key performance indicator (KPI) values and one or more statistical values specifically associated with the aerial UE. Examples KPI values can include values associated with reference signal received power (RSRP) measurement values, received signal strength indicator (RSSI) measurement values, quality of service (QoS) metric values, signal to noise ratio (SNR) values, received signal code power (RSCP) values, signal to interference ratio (SIR) values, signal to interference plus noise ratio (SINR) values, or other similarly appropriate values. Generally, the KPI values can be values that have been periodically returned within measurement reports by UEs extant within the control or coverage ambit associated with network equipment, such as serving cell equipment, neighbor cell equipment, or similar network equipment.

Once handover engine 102 has dispatched the A2_event delay value to the specific aerial UE, handover engine 102 can periodically monitor aerial UE ping-pong handover events, and where needed, can send additional messages to the aerial UE with larger or smaller A2_event delay values. For example, in response to handover engine 102 determining that an initial value of T1 that was initially transmitted to aerial UE was not sufficient to quiesce handover ping-pong, handover engine 102, based on KPI values and/or statistical values determined based on the KPI values, can determine a subsequent A2_event delay value for T1, and thereafter can send the subsequent A2_event delay value (T1) to the aerial UE. It should be noted generally that the initial T1 value can be smaller than subsequent values of T1. Nevertheless, in order to mitigate ping-pong handovers there can be instances where the subsequent values of T1 can be smaller than the initial value of T1.

The aerial UE in response to receiving, from handover engine 102, the message including the A2_event delay value (T1), can use its own global positioning satellite (GPS) functionalities and/or facilities to confirm that it is actually hovering (e.g., moving slightly vertically and/or horizontally) at altitude above terrain (or is hovering over a body of water). The aerial UE on confirming that it is hovering at altitude over terrain (or over a body of water) can trigger an A2_aerial event and use the received delay value T1. An A2_aerial event effectively forces the aerial UE to apply the delay value T1 to its own s-Measure value; while the aerial UE is in active mode, intra frequency measurements are activated when RSRP measurement are less than the value of s-Measure for a time duration more than the value set as T1. In this regard, the value of T1 is intended to slow down aerial UE cell measuring and thus avoid or mitigate handover ping-pong.

While an A2_event is valid, UEs are typically not permitted to send RLF reports to the serving cell equipment (e.g., to handover engine 102). However, in instances where there is an A2_aerial event, an identified aerial UE can be configured to create ping-pong handover RLF reports and send the ping-pong handover RLF reports back to the serving cell equipment (e.g., to handover engine 102) for additional analysis and/or processing by handover engine 102.

Handover engine 102 on receiving the ping-pong handover RLF report can fine tune the handover settings through use of MRO processes, as outlined above. An aerial UE that has triggered an A2_aerial event should typically not send RLF reports other than ping-pong handover RLF reports. In this regard an A2_aerial event becomes invalid (e.g., T1=0) when the aerial UE determines that it is no longer airborne and hovering (e.g., the aerial UE has become a ground based UE).

Figure 2:
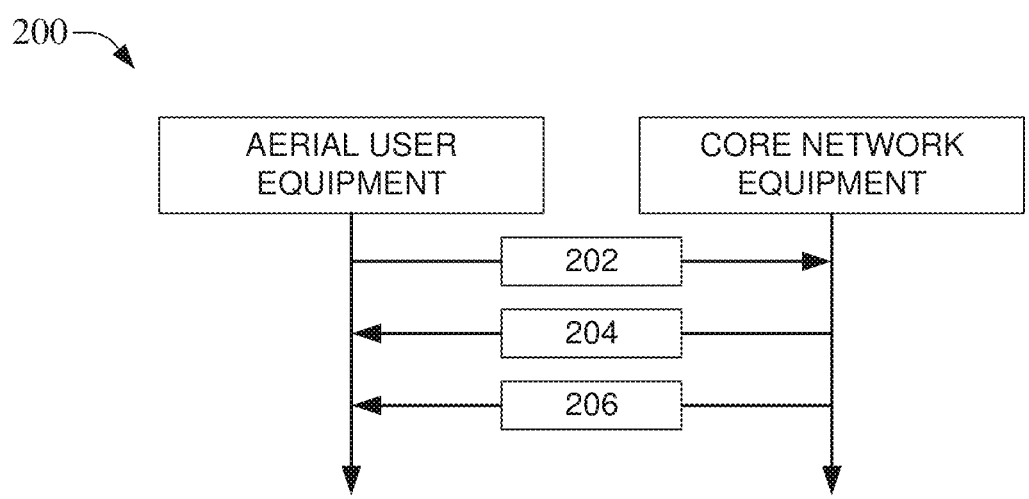
FIG. 2 provides depiction of a time sequence chart that mitigates or facilitates the avoidance of handover ping-pong for aerial user equipment (UE) operational in terrestrial 4G and/or 5G LTE networks, in accordance with aspects of the subject disclosure.

FIG. 2 illustrates an example time sequence chart 200 that can be used to mitigate or avoid handover ping-pong occurrences in the context of aerial UE that are served by terrestrial based 4G and 5G network equipment. Time sequence chart can commence at act 202, wherein a UE (e.g., user equipment that initially, from the perspective of terrestrial based network equipment, such as core network equipment, is considered to be an ordinary UE, but in subsequent acts will be determined to be airborne) can contact, via transmitted signal message data, land based core network equipment (e.g., equipment such as MEC equipment, SON equipment, RIC equipment, serving cell equipment, and other appropriate equipment). Also, at act 202 the UE can include, in the transmitted signal message data, subscription data and/or subscriber priority (SPID) data that can identify to the network equipment that the contacting UE is an aerial type UE.

At act 204 the core network equipment, in response to receiving the transmitted signal message data comprising the subscription data and/or SPID data, can determine based at least in part on the subscription data and/or SPID data that the UE associated with the subscription data and/or the SPID data is an airborne UE. In some embodiments the subscription data and/or the SPID data can comprise a specific flag or an identified or identifiable field that indicates that the contacting UE is an aerial UE.

Also at act 204 the core network equipment based on measurement reports that can have been returned to the core network equipment by, for example, the aerial UE, various other terrestrial based UEs, and/or other core network equipment, proximate to, or within a broadcast umbra and/or penumbra cast by one or more antennas associated with the core network equipment, that the aerial UE is performing ping-pong handover between first network equipment (e.g., first eNB equipment) and second network equipment (e.g., second eNB equipment). Core network equipment, based at least on the determinations that (a) the UE is an aerial UE, and (b) there are determinable ping-pong handover events occurring between first network equipment and second network equipment with respect to the aerial UE, can transmit signal data to the aerial UE requesting the aerial UE to confirm the existence of the ping-pong handover events. The signal data can comprise an A2_event delay value (T1). Once the core network equipment has dispatched the signal data to the aerial UE it can vigilantly monitor the aerial UE and the developing situation with regard the ping-pong handover occurrences in the context of the aerial UE, the first network equipment, and the second network equipment.

On receiving, from the core network equipment, the signal data comprising the A2_event delay value (T1) the aerial UE can confirm, using its own GPS functionalities and/facilities, that it is actually hovering at altitude over terrain and/or over a body or water. The aerial UE, on confirming that it is hovering at altitude over terrain and/or over a body of water can trigger an A2_aerial event and use the A2_event delay value (T1). As mentioned earlier, an A2_aerial event forces the aerial UE to apply the delay value T1 as its s-Measure value. Thus while the aerial UE is an active mode, intra frequency measurements can be activated when RSRP measurements are less than the value of s-Measure for the defined or definable duration of time T1. The define or definable duration of time T1 is intended to slow down aerial UE performing measuring KPI values associated with the first network equipment and/or the second network equipment, and thereafter sending RLF reports to core network equipment.

As noted above, while an A2_aerial event is valid, UEs are typically not permitted to send RLF reports to core network equipment. However, in instances where an A2_aerial event is triggered and for the duration of the triggered A1_aerial event, an identified aerial UE can be configured to create ping-pong handover RLF reports and send these ping-pong handover RLF reports back to the core network equipment for further analysis and/or processing.

At act 206, core network equipment, as a consequence of an A2_aerial event being in effect, and on receiving ping-pong handover reports from the aerial UE during the time of the A2_aerial event, core network equipment can fine tune setting through use of one or more MRO processes.

Figure 3:
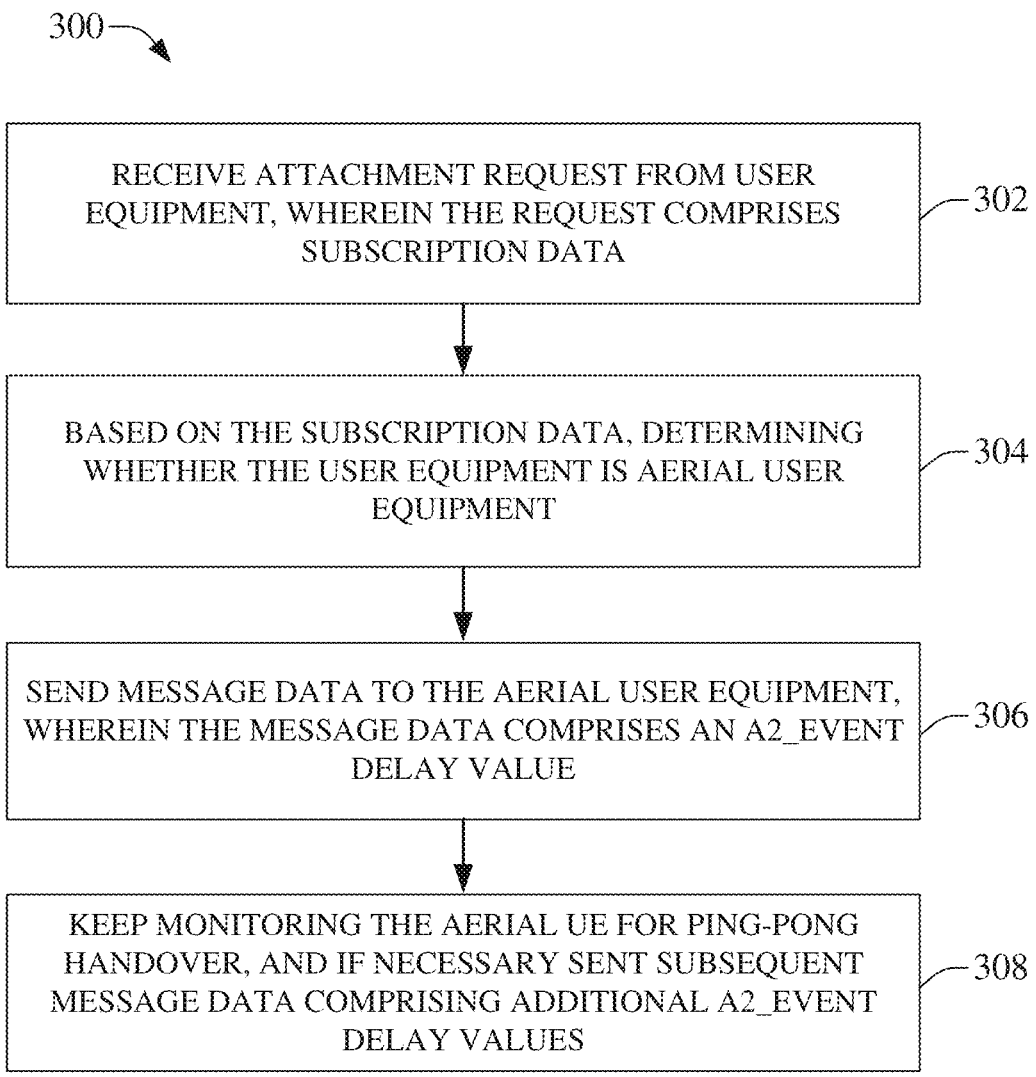
FIG. 3 provides illustration of a flow chart or method for the mitigation or avoidance of handover ping-pong for aerial user equipment (UE) operational in terrestrial 4G and/or 5G LTE networks, in accordance with aspects of the subject disclosure.
Figure 4:
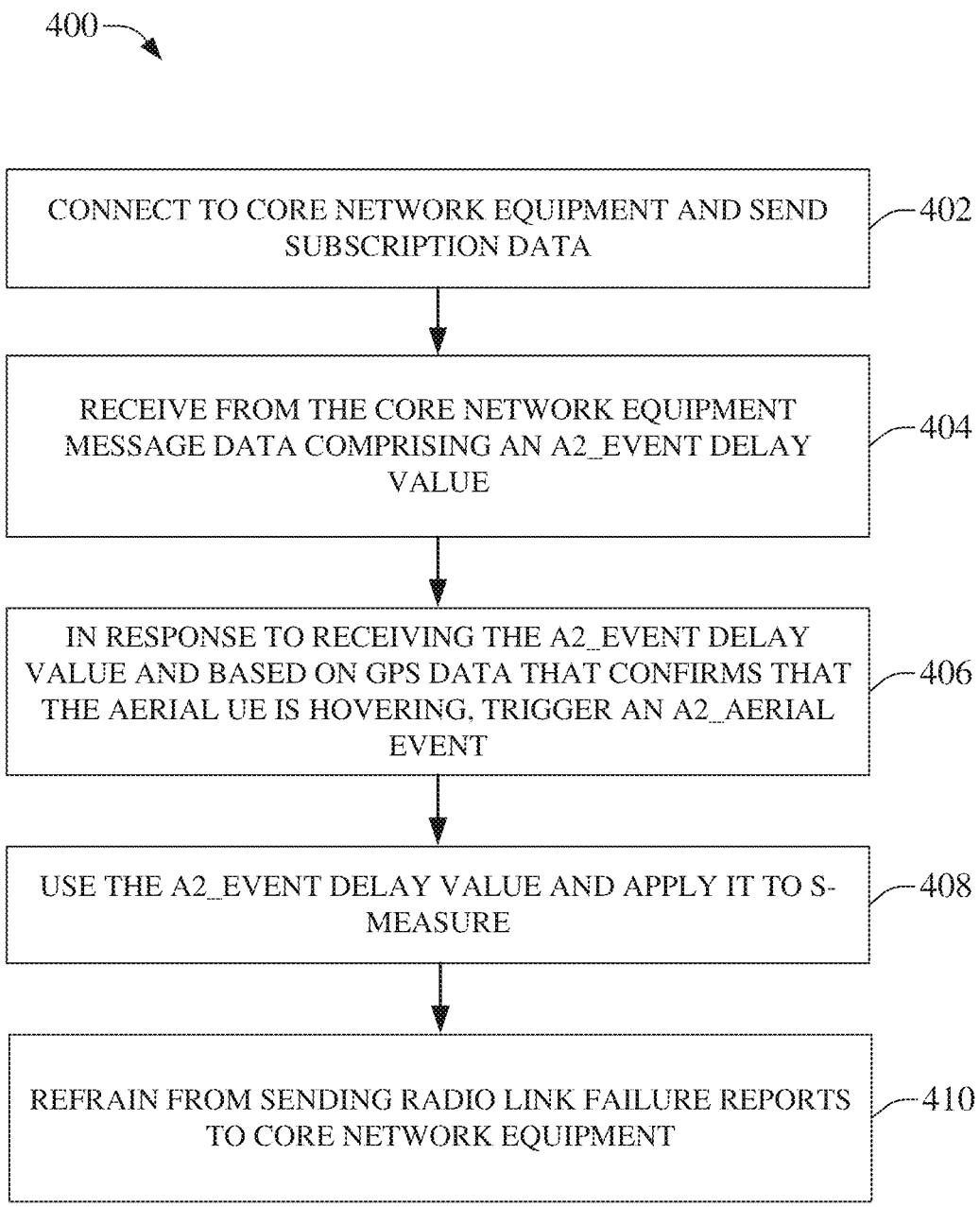
FIG. 4 provides illustration of a flow chart or method for the mitigation or avoidance of handover ping-pong for aerial user equipment (UE) operational in terrestrial 4G and/or 5G LTE networks, in accordance with aspects of the subject disclosure.
Figure 5:
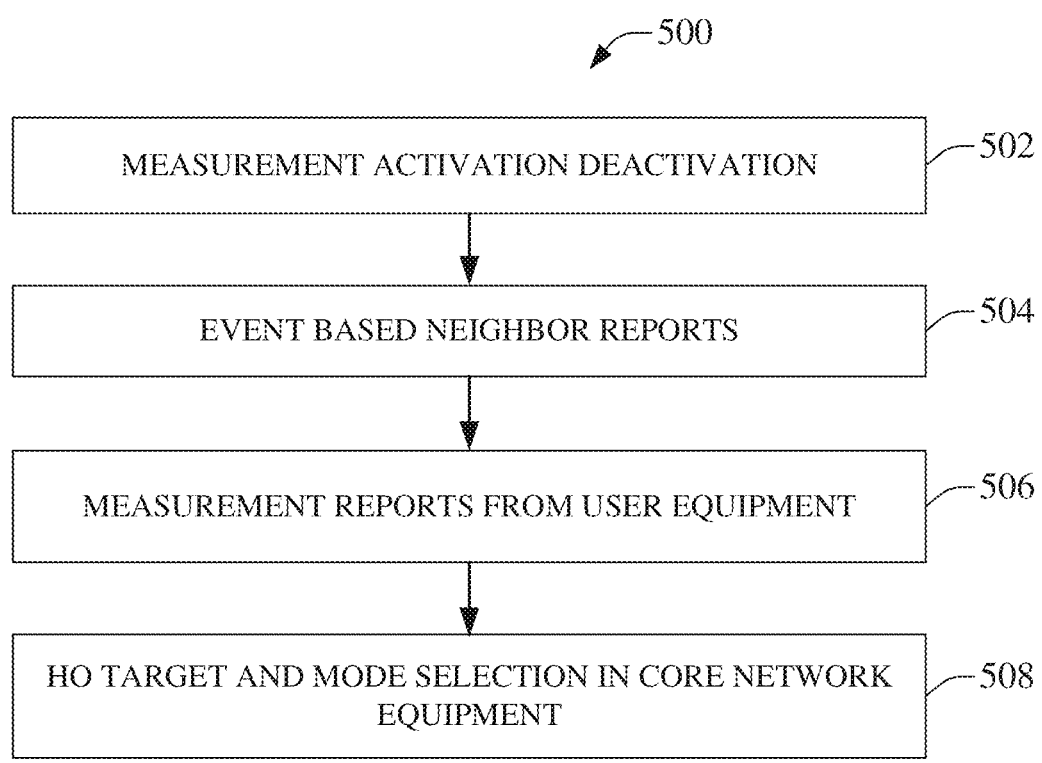
FIG. 5 provides illustration of a flow chart or method for LTE coverage handover, in accordance with aspects of the subject disclosure.

In view of the example system(s) described above, example method(s) that can be implemented in accordance with the disclosed subject matter can be better appreciated with reference to the flowcharts in FIGS. 3-5. For purposes of simplicity of explanation, example method disclosed herein is presented and described as a series of acts; however, it is to be understood and appreciated that the disclosure is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, the disclosed example method can be implemented in combination with one or more other methods, to accomplish one or more aspects herein described. It should be further appreciated that the example method disclosed throughout the subject specification are capable of being stored on an article of manufacture (e.g., a computer-readable medium) to allow transporting and transferring such methods to computers for execution, and thus implementation, by a processor or for storage in a memory.

FIG. 3 illustrates a method 300 that can be used to mitigate or avoid handover ping-pong occurrences in the context of aerial UE that are served by terrestrial based 4G and 5G network equipment. Method 300 can be performed by core network equipment (e.g., core network equipment 100) wherein at 302 an attachment request can be received from user equipment. Generally, the attachment request can comprise subscription data and/or SPID data that can be used to identify the type of UE that is requesting attachment with core network equipment. At 304, based at least in part on the subscription data and/or the SPID data, a determination can be made in regard to whether or not the contacting UE is a terrestrial based UE of an aerial UE. Where it is ascertained that the contacting UE is an aerial UE, at 306 a further determination can be made based on measurement reports that can have been returned from groups of network equipment and/or UE (terrestrial based UE and/or airborne UE) associated with the groups of network equipment whether the determined aerial UE is experiencing ping-pong handover between two or more of the groups of network equipment (e.g., ping-pong handover events between first network equipment of the groups of network equipment and second network equipment of the groups of network equipment). Based at least on determining that the aerial UE is experiencing ping-pong handover events between first network equipment of the groups of network equipment and second network equipment of the groups of network equipment, at 306 the core network equipment can send a message to the aerial UE requesting that the aerial UE confirm that it is airborne and is hovering at height over terrain and/or over a body of water. Additionally, at 306 the message data can include a determined A2_event delay value (T1). Once the core network equipment has sent the message data including the determined A2_event delay value (T1) to the aerial UR, at 308, the core network equipment can continue monitoring handover ping-pong handover events that can be occurring between aerial UE, the first network equipment of the groups of network equipment, and/or the second network equipment of the groups of network equipment. Also at 308, while core network equipment is monitoring for handover ping-pong handover events that can be occurring between aerial UE, the first network equipment, and/or the second network equipment, where necessary, core network equipment can transmit additional message data to the aerial UE, wherein the additional message data can comprise additional A2_event delay values.

FIG. 4 illustrates a method 400 that can be used to mitigate or avoid handover ping-pong occurrences in the context of aerial UE that are served by terrestrial based 4G and 5G network equipment. Method 400 can be implemented on aerial user equipment, such as unmanned aerial vehicles (UAVs). At act 402, aerial user equipment can connect to core network equipment and in so doing aerial user equipment can include in the attachment message to core network equipment subscription data or SPID data comprising at least a flag, field, or indicator that informs core network equipment that it is aerial UE. At act 404, in response to having sent an attachment request to core network equipment informing core network equipment of its subscription data and/or SPID data, and that it is an aerial UE, the aerial UE can receive, from core network equipment, message data comprising an instruction to confirm that the aerial UE is actually hovering at altitude over land (and/or over a body of water, such as a lake, pond, river, stream, bay, inlet, and the like). The message data can also comprise an A2_event delay value (T1) that can indicate that core network equipment, based on collections of measurement reports, has determined that the aerial UE can be experiencing ping-pong handover events between two or more cell network equipment (e.g., serving cell equipment and one or more neighboring cell equipment). At 406 based on the instruction to verify that the aerial UE is hovering over terrain, aerial UE can use facilities and/or functionalities associated with GPS aspects associated with aerial UE to confirm that it is actually airborne. Further at 406, based on confirming that aerial UE is actually airborne and further based on having received an A2_event delay value (T1), aerial UE can trigger an A2_aerial event. At 408 aerial UE can use the A2_event delay value (T1) and apply the A2_event delay value (T1) as its s-Measure in the following formulation: RSRP<s-Measure. Intra frequency measurements can be activated while RSRP<s-Measure and when the aerial US is in active mode. At act 410, while the A2_aerial event is triggered the aerial UE will generally refrain from sending RLF reports to core network equipment, instead sending ping-pong handover RLF reports to core network equipment.

FIG. 5 illustrates a method 500 that can be used to mitigate or avoid handover ping-pong occurrences in the context of aerial UE that are served by terrestrial based 4G and 5G network equipment. Method 500 is a generalized method that can in part be implement on aerial UE and in part on core network equipment. Method 500 provides a handover process overview and should be viewed in conjunction with FIG. 6 that provides an event and corresponding trigger condition table. At act 502, a UE continuously monitors serving cell equipment. Generally, A2/A1 events are used to activate/deactivate neighbor cell equipment measurements when radio conditions are getting worse. At act 504 event based neighbor cell equipment reports are triggered by A3 and A5 events for intra-RAT; A4 events for inter-frequency; and B1 and B2 events for inter-RAT. At act 506 measurement reports from UE are sent to core network equipment, wherein the measurement reports comprise a prioritized (ranked and/or ordered) list of neighbor cell equipment. Generally, the prioritized list of neighbor cell equipment can be ranked or ordered from best to worst. At act 508 cell equipment can decide the urgency of handover and can identify a prioritized list of handover target cell equipment. The cell equipment can select target cell equipment for handover as well as handover mode, such as intra cell equipment (e.g., serving cell equipment and neighbor cell equipment) handover; intra LTE inter cell equipment handover via X2 facilities; intra LTE inter cell equipment handover via Si facilities; handover to wideband code division multiple access (WCDMA); or network assisted cell change (NACC) to global system for mobile (GSM) communications.

Figure 10:
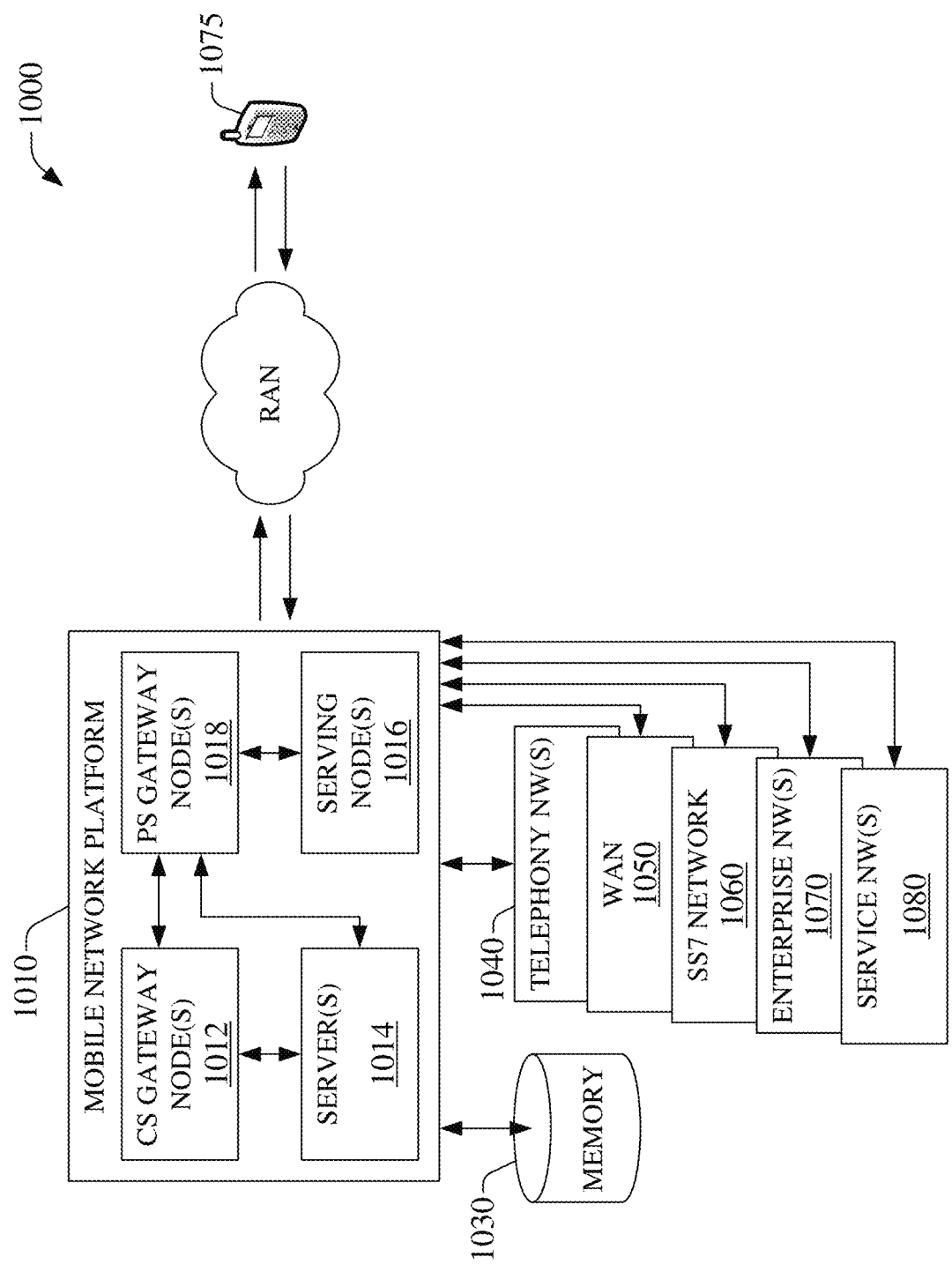
FIG. 10 is a block diagram of an example embodiment of a mobile network platform to implement and exploit various features or aspects of the subject disclosure.

FIG. 10 presents an example embodiment 1000 of a mobile network platform 1010 that can implement and exploit one or more aspects of the disclosed subject matter described herein. Generally, wireless network platform 1010 can include components, e.g., nodes, gateways, interfaces, servers, or disparate platforms, which facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1010 can be included in telecommunications carrier networks, and can be considered carrier-side components as discussed elsewhere herein. Mobile network platform 1010 includes CS gateway node(s) 1012 which can interface CS traffic received from legacy networks like telephony network(s) 1040 (e.g., public switched telephone network (PSTN), or public land mobile network (PLMN)) or a signaling system #7 (SS7) network 1070. Circuit switched gateway node(s) 1012 can authorize and authenticate traffic (e.g., voice) arising from such networks. Additionally, CS gateway node(s) 1012 can access mobility, or roaming, data generated through SS7 network 1060; for instance, mobility data stored in a visited location register (VLR), which can reside in memory 1030. Moreover, CS gateway node(s) 1012 interfaces CS-based traffic and signaling and PS gateway node(s) 1018. As an example, in a 3GPP UMTS network, CS gateway node(s) 1012 can be realized at least in part in gateway GPRS support node(s) (GGSN). It should be appreciated that functionality and specific operation of CS gateway node(s) 1012, PS gateway node(s) 1018, and serving node(s) 1016, is provided and dictated by radio technology(ies) utilized by mobile network platform 1010 for telecommunication.

In addition to receiving and processing CS-switched traffic and signaling, PS gateway node(s) 1018 can authorize and authenticate PS-based data sessions with served mobile devices. Data sessions can include traffic, or content(s), exchanged with networks external to the wireless network platform 1010, like wide area network(s) (WANs) 1050, enterprise network(s) 1070, and service network(s) 1080, which can be embodied in local area network(s) (LANs), can also be interfaced with mobile network platform 1010 through PS gateway node(s) 1018. It is to be noted that WANs 1050 and enterprise network(s) 1070 can embody, at least in part, a service network(s) like IP multimedia subsystem (IMS). Based on radio technology layer(s) available in technology resource(s) 1017, packet-switched gateway node(s) 1018 can generate packet data protocol contexts when a data session is established; other data structures that facilitate routing of packetized data also can be generated. To that end, in an aspect, PS gateway node(s) 1018 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1000, wireless network platform 1010 also includes serving node(s) 1016 that, based upon available radio technology layer(s) within technology resource(s) 1017, convey the various packetized flows of data streams received through PS gateway node(s) 1018. It is to be noted that for technology resource(s) 1017 that rely primarily on CS communication, server node(s) can deliver traffic without reliance on PS gateway node(s) 1018; for example, server node(s) can embody at least in part a mobile switching center. As an example, in a 3GPP UMTS network, serving node(s) 1016 can be embodied in serving GPRS support node(s) (SGSN).

For radio technologies that exploit packetized communication, server(s) 1014 in wireless network platform 1010 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1010. Data streams (e.g., content(s) that are part of a voice call or data session) can be conveyed to PS gateway node(s) 1018 for authorization/authentication and initiation of a data session, and to serving node(s) 1016 for communication thereafter. In addition to application server, server(s) 1014 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1010 to ensure network's operation and data integrity in addition to authorization and authentication procedures that CS gateway node(s) 1012 and PS gateway node(s) 1018 can enact. Moreover, provisioning server(s) can provision services from external network(s) like networks operated by a disparate service provider; for instance, WAN 1050 or Global Positioning System (GPS) network(s) (not shown). Provisioning server(s) can also provision coverage through networks associated to wireless network platform 1010 (e.g., deployed and operated by the same service provider), such as femto-cell network(s) (not shown) that enhance wireless service coverage within indoor confined spaces and offload radio access network resources in order to enhance subscriber service experience within a home or business environment by way of UE 1075.

It is to be noted that server(s) 1014 can include one or more processors configured to confer at least in part the functionality of macro network platform 1010. To that end, the one or more processor can execute code instructions stored in memory 1030, for example. It should be appreciated that server(s) 1014 can include a content manager 1015, which operates in substantially the same manner as described hereinbefore.

In example embodiment 1000, memory 1030 can store information related to operation of wireless network platform 1010. Other operational information can include provisioning information of mobile devices served through wireless platform network 1010, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1030 can also store information from at least one of telephony network(s) 1040, WAN 1050, enterprise network(s) 1070, or SS7 network 1060. In an aspect, memory 1030 can be, for example, accessed as part of a data store component or as a remotely connected memory store.

Figure 11:
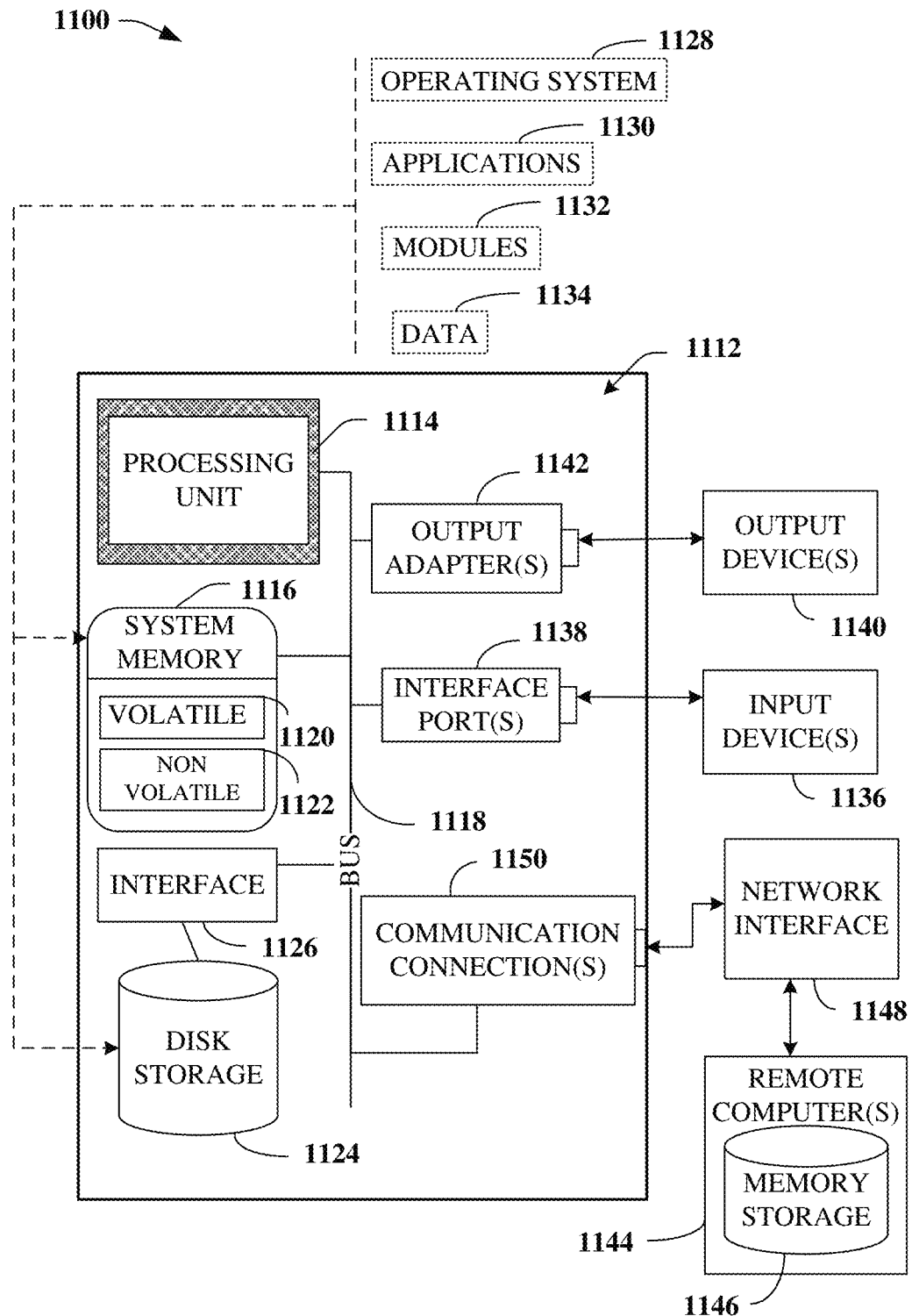
FIG. 11 illustrates a block diagram of a computing system operable to execute the disclosed systems and methods in accordance with an embodiment.

In order to provide a context for the various aspects of the disclosed subject matter, FIG. 11, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1120 (see below), non-volatile memory 1122 (see below), disk storage 1124 (see below), and memory storage 1146 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 11 illustrates a block diagram of a computing system 1100 operable to execute the disclosed systems and methods in accordance with an embodiment. Computer 1112, which can be, for example, part of the hardware of system 110, includes a processing unit 1114, a system memory 1116, and a system bus 1118. System bus 1118 couples system components including, but not limited to, system memory 1116 to processing unit 1114. Processing unit 1114 can be any of various available processors. Dual microprocessors and other multiprocessor architectures also can be employed as processing unit 1114.

System bus 1118 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

System memory 1116 can include volatile memory 1120 and nonvolatile memory 1122. A basic input/output system (BIOS), containing routines to transfer information between elements within computer 1112, such as during start-up, can be stored in nonvolatile memory 1122. By way of illustration, and not limitation, nonvolatile memory 1122 can include ROM, PROM, EPROM, EEPROM, or flash memory. Volatile memory 1120 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 can also include removable/non-removable, volatile/non-volatile computer storage media. FIG. 11 illustrates, for example, disk storage 1124. Disk storage 1124 includes, but is not limited to, devices like a magnetic disk drive, floppy disk drive, tape drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to system bus 1118, a removable or non-removable interface is typically used, such as interface 1126.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 11 describes software that acts as an intermediary between users and computer resources described in suitable operating environment 1100. Such software includes an operating system 1128. Operating system 1128, which can be stored on disk storage 1124, acts to control and allocate resources of computer system 1112. System applications 1130 take advantage of the management of resources by operating system 1128 through program modules 1132 and program data 1134 stored either in system memory 1116 or on disk storage 1124. It is to be noted that the disclosed subject matter can be implemented with various operating systems or combinations of operating systems.

A user can enter commands or information into computer 1112 through input device(s) 1136. As an example, mobile device and/or portable device can include a user interface embodied in a touch sensitive display panel allowing a user to interact with computer 1112. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1114 through system bus 1118 by way of interface port(s) 1138. Interface port(s) 1138 include, for example, a serial port, a parallel port, a game port, a universal serial bus (USB), an infrared port, a Bluetooth port, an IP port, or a logical port associated with a wireless service, etc. Output device(s) 1140 use some of the same type of ports as input device(s) 1136.

Thus, for example, a USB port can be used to provide input to computer 1112 and to output information from computer 1112 to an output device 1140. Output adapter 1142 is provided to illustrate that there are some output devices 1140 like monitors, speakers, and printers, among other output devices 1140, which use special adapters. Output adapters 1142 include, by way of illustration and not limitation, video and sound cards that provide means of connection between output device 1140 and system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. Remote computer(s) 1144 can be a personal computer, a server, a router, a network PC, cloud storage, cloud service, a workstation, a microprocessor based appliance, a peer device, or other common network node and the like, and typically includes many or all of the elements described relative to computer 1112.

For purposes of brevity, only a memory storage device 1146 is illustrated with remote computer(s) 1144. Remote computer(s) 1144 is logically connected to computer 1112 through a network interface 1148 and then physically connected by way of communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1150 refer(s) to hardware/software employed to connect network interface 1148 to bus 1118. While communication connection 1150 is shown for illustrative clarity inside computer 1112, it can also be external to computer 1112. The hardware/software for connection to network interface 1148 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. Network equipment, comprising:
a processor; and
a memory that stores instructions that, when executed by the processor, facilitate performance of operations, comprising:
receiving information from a device that identifies the device as an aerial user equipment, wherein the information allows for a determination that the device is airborne and thus distinguished from being a ground based user equipment;
determining, based upon receiving a handover radio link failure report, that the aerial user equipment is engaged in a ping-pong handover event with terrestrial based network equipment situated within a defined geographic area; and
transmitting, based upon receiving the handover radio link failure report, an instruction to the aerial user equipment to generate a confirmation of the ping-pong handover event, wherein the instruction comprises a delay value representing a back off time value for the aerial user equipment to refrain from gathering measurement data within the defined geographic area after generating the confirmation.

2. The network equipment of claim 1, wherein the handover radio link failure report was generated by, and received from, the aerial user equipment after an aerial failure event applicable to the aerial user equipment occurred.

3. The network equipment of claim 2, wherein the aerial user equipment, based on the handover radio link failure report and based on a global positioning satellite coordinate value, is determined to be hovering above terrain.

4. The network equipment of claim 1, wherein the aerial user equipment is determined to be traveling through the defined geographic area controlled by the network equipment.

5. The network equipment of claim 1, wherein the operations further comprise receiving, from the aerial user equipment, indicator data representing that the aerial user equipment is currently airborne within the defined geographic area controlled by the terrestrial based network equipment.

6. The network equipment of claim 1, wherein the operations further comprise instructing the aerial user equipment to adjust an altitude value over which the aerial user equipment is hovering.

7. The network equipment of claim 1, wherein the operations further comprise instructing the aerial user equipment to adjust a global positioning satellite coordinate value to move the aerial user equipment from a first location within the defined geographic area to a second location within the defined geographic area.

8. The network equipment of claim 1, wherein the operations further comprise monitoring additional ping-pong handover events, other than the ping-pong handover event, between the aerial user equipment and the terrestrial based network equipment situated within the defined geographic area.

9. The network equipment of claim 8, wherein the instruction is a first instruction, wherein the delay value is a first delay value, wherein the back off time value is a first back off time value, and wherein the operations further comprise sending, to the aerial user equipment, a second instruction comprising a second delay value representing a second back off time value.

10. A method, comprising:
receiving, by a system comprising a processor, information from a device that identifies the device as an aerial user equipment, wherein the information allows for a determination that the device is airborne and thus distinguished from being a ground based user equipment;
determining, by the system and based upon receiving a handover radio link failure report, that the aerial user equipment is engaged in a ping-pong handover event with terrestrial based network equipment located in a defined geographic area; and
transmitting, by the system and based upon receiving the handover radio link failure report, an instruction to the aerial user equipment to generate a confirmation of the ping-pong handover event, wherein the instruction comprises a delay value representing a back off time for the aerial user equipment to refrain from gathering measurement data within the defined geographic area after generating the confirmation.

11. The method of claim 10, wherein the delay value is determined based on the handover radio link failure report.

12. The method of claim 11, wherein the aerial user equipment, based on the handover radio link failure report and based on a global positioning satellite coordinate value, is determined to be hovering at an altitude over terrain.

13. The method of claim 10, wherein the aerial user equipment is determined to be traversing the defined geographic area controlled by the terrestrial based network equipment.

14. The method of claim 10, further comprising determining, by the system, based on an indicator representing that the aerial user equipment is currently airborne within the defined geographic area, that the aerial user equipment is being controlled by the terrestrial based network equipment.

15. The method of claim 10, further comprising instructing, by the system, the aerial user equipment to adjust an altitude value representative of an altitude at which the aerial user equipment is hovering to adjust the altitude at which the aerial user equipment is hovering.

16. The method of claim 10, further comprising instructing, by the system, the aerial user equipment to adjust a location coordinate value to move the aerial user equipment from a first location in the defined geographic area to a second location in the defined geographic area.

17. The method of claim 10, further comprising monitoring, by the system, additional ping-pong handover events that occurred between the aerial user equipment and the terrestrial based network equipment located in the defined geographic area.

18. The method of claim 17, wherein the instruction is a first instruction, wherein the delay value is a first delay value, and wherein the back off time is a first back off time, and further comprising:
sending, by the system to the aerial user equipment, a second instruction comprising a second delay value representing a second back off time, replacing the first back off time, for the aerial user equipment to refrain from gathering the measurement data within the defined geographic area.

19. A non-transitory machine-readable medium, comprising executable instructions that, when executed by a processor, facilitate performance of operations, comprising:
- receiving information from a device that identifies the device as an aerial user equipment, wherein the information allows for a determination that the device is airborne and thus distinguished from being a ground based user equipment;
- determining, based upon receiving a handover radio link failure report, that the aerial user equipment is engaged in a ping-pong handover event with terrestrial based network equipment configured to provide service to a defined geographic area; and
- transmitting, based upon receiving the handover radio link failure report, an instruction to the aerial user equipment to generate a confirmation of the ping-pong handover event, wherein the instruction comprises a back off time value applicable to prevent the aerial user equipment, after generating the confirmation, from gathering measurement data within the defined geographic area for an amount of time represented by the back off time value.

20. The non-transitory machine-readable medium of claim 19, wherein the back off time value is determined based on the handover radio link failure report.

* * * * *

UNITED STATES PATENT AND TRADEMARK OFFICE
CERTIFICATE OF CORRECTION

Page 1 of 1

PATENT NO. : 11,889,404 B2
APPLICATION NO. : 18/069101
DATED : January 30, 2024
INVENTOR(S) : Daniel Vivanco, David Beppler and Slawomir Stawiarski It is certified that error appears in the above-identified patent and that said Letters Patent is hereby corrected as shown below:

On the Title Page

Assignees are listed as "AAT&T Intellectual Property I, L.P., Atlanta, GA (US); AT&T Technical Services Company, Inc., Vienna, VA (US)" and should instead be "AT&T Intellectual Property I, L.P., Atlanta, GA (US); AT&T Technical Services Company, Inc., Vienna, VA (US)".

Signed and Sealed this
Fifth Day of March, 2024

Katherine Kelly Vidal
*Director of the United States Patent and Trademark Office*